United States Patent
Kwong

(10) Patent No.: US 9,763,245 B2
(45) Date of Patent: Sep. 12, 2017

(54) SYSTEM AND METHODS FOR CONTROLLING THE USAGE OF A CARRIER

(71) Applicant: Telefonaktiebolaget L M Ericsson (publ)

(72) Inventor: Waikwok Kwong, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 15 days.

(21) Appl. No.: 14/772,499

(22) PCT Filed: Dec. 16, 2013

(86) PCT No.: PCT/SE2013/051519
§ 371 (c)(1),
(2) Date: Sep. 3, 2015

(87) PCT Pub. No.: WO2014/137262
PCT Pub. Date: Sep. 12, 2014

(65) Prior Publication Data
US 2016/0014775 A1    Jan. 14, 2016

Related U.S. Application Data

(60) Provisional application No. 61/772,148, filed on Mar. 4, 2013.

(51) Int. Cl.
| H04W 72/04 | (2009.01) |
| H04B 7/26 | (2006.01) |
| H04L 1/18 | (2006.01) |
| H04W 72/12 | (2009.01) |

(52) U.S. Cl.
CPC ...... *H04W 72/0446* (2013.01); *H04B 7/2646* (2013.01); *H04B 7/2656* (2013.01);
(Continued)

(58) Field of Classification Search
None
See application file for complete search history.

(56) References Cited

U.S. PATENT DOCUMENTS

| 2011/0110337 A1* | 5/2011 | Grant | H04B 1/707 370/335 |
| 2011/0310795 A1* | 12/2011 | Andersson | H04W 72/1231 370/328 |
| 2013/0039393 A1* | 2/2013 | Choi | H04L 1/1874 375/219 |

FOREIGN PATENT DOCUMENTS

WO    9217957 A1    10/1992

OTHER PUBLICATIONS

Supplementary European Search Report issued on Feb. 15, 2016 in corresponding EP application No. 13877078, 4 pages.
(Continued)

*Primary Examiner* — Mohammad Adhami
(74) *Attorney, Agent, or Firm* — Rothwell, Figg, Ernst & Manbeck, P.C.

(57) ABSTRACT

The disclosure relates to a method (200) performed by a control system (2, 3, 4) that controls the usage of a first carrier, which first carrier is divided into transmission segments and each transmission segment consisting of N transmission time intervals, where N is greater than or equal to 2. The method (200) comprises the control system (2, 3, 4): configuring (202) a first wireless communication device UE1 to transmit data on a physical traffic channel using the first carrier by transmitting the data only during a first subset of the N transmission time intervals in each transmission segment, wherein the first subset of the N transmission time intervals consists of n transmission time intervals and n<N; configuring (204) the first wireless communication device UE1 to transmit control information on a physical control channel using the first carrier by transmitting the control
(Continued)

information during only the first subset of transmission time intervals in each transmission segment; and scheduling (206) a downlink transmission for the first wireless communication device UE1 such that a transmission of a feedback signal by the first wireless communication device UE1 in response to the downlink transmission will occur only during one or more of the transmission time intervals included in the first subset of transmission time intervals in each transmission segment.

22 Claims, 6 Drawing Sheets

(52) U.S. Cl.
CPC .......... *H04L 1/1822* (2013.01); *H04L 1/1887* (2013.01); *H04W 72/0413* (2013.01); *H04W 72/1273* (2013.01)

(56) References Cited

OTHER PUBLICATIONS

Ericsson et al., "On the support for per-HARQ-process activation in CELL_FACH and TTI alignment between CELL-FACH and CELL-DCH UEs" In: 3GPP TSG-RAN WG2 Meeting #77, R2-120382, Dresden, Germany, Feb. 6-10, 2012, Jan. 30, 2012, XP050565210, 4 pages.

Ericsson, St-Ericsson, "Further EUL enhancements—dedicated secondary carrier" In: 3GPP TSG-RAN WG2 #81, R2-130249, St. Julian's, Malta, Jan. 28-Feb. 1, 2013, Jan. 19, 2013, XP050668302, 3 pages.

Ericsson, St-Ericsson, "Deployment Scenarios for Clean Carriers", In 3GPP TSG RAN WG1 Meeting #74, R1-133666, Barcelona, Spain, Aug. 19-23, 2013, Aug. 10, 2013, XP050716754, 5 pages.

* cited by examiner

SYSTEM AND METHODS FOR CONTROLLING THE USAGE OF A CARRIER

CROSS-REFERENCE TO RELATED APPLICATIONS

This application is a 35 U.S.C. §371 National Phase Entry Application from PCT/SE2013/051519, filed Dec. 16, 2013, and designating the United States, which claims priority to U.S. Provisional Application No. 61/772,148, filed Mar. 4, 2013. The contents of both applications are incorporated by reference.

TECHNICAL FIELD

The technology disclosed herein relates to the field of communication networks, and in particular to a communication system and methods within a communication system for controlling the usage of a carrier.

BACKGROUND

In some networks based on 3GPP (Third Generation Partnership Project) for instance networks based on Wideband Code Division Multiple Access (WCDMA), a wireless communication device (WCD) receives and transmits data on only one carrier frequency (or "carrier" for short). Due to non-orthogonality between users, which results in interference leakage between the users, the uplink throughput is limited to 2-3 Mbps in scenarios with multiple users.

To enable high-bitrate operation in a real-network environment, the high-bitrate transmissions must be isolated from users that are vulnerable to the high interference created. A natural way to accomplish this within the current WCDMA technology is to make use of a "clean carrier" concept. In this concept, carriers are divided into regular carriers and clean carriers. The regular carriers provide the basic needs of a user. The clean carriers, on the other hand, may be dedicated exclusively to high-bitrate transmissions. On a clean carrier, users are scheduled by the network to transmit one at a time as much as possible in order to avoid interfering with one another.

SUMMARY

The clean-carrier concept generally requires the dedication of an entire carrier for high-bitrate operations. Since radio spectrum is a scarce commodity, this is a rather large investment for the network. All clean carrier solutions require some kind of WCD support, e.g. the ability to transmit at a very high bitrate, the capability to switch between regular and clean carriers in an efficient manner, multi-carrier capability, and/or the capability to perform certain clean-carrier specific signaling. During the initial phase of a clean carrier deployment when the penetration of WCDs with this capability is low, the clean carrier becomes a very expensive operation that serves only a handful of users.

The present disclosure provides a cost-effective method for introducing clean carrier operations. In some embodiments, this method includes time-multiplexing "legacy" WCDs and "clean-carrier" WCDs on the same carrier. In this way, the carrier can be a hybrid carrier. That is, during certain time periods the carrier functions as a conventional carrier and during other time periods the carrier can be operated as a clean-carrier. As used herein a "legacy" WCD is a WCD that lacks one or more certain abilities, such as, for example: the ability to transmit at a very high bitrate, the capability to switch between regular and clean carriers in an efficient manner, multi-carrier capability, and/or the capability to perform certain clean-carrier specific signaling. As used herein a "clean-carrier" WCD is a WCD that has certain capabilities, such as, for example: the ability to transmit at a very high bitrate, the capability to switch between regular and clean carriers in an efficient manner, multi-carrier capability, and/or the capability to perform certain clean-carrier specific signaling.

As one example, this disclosure describes introducing a clean-carrier in a WCDMA network. In this particular embodiment, this method uses per-HARQ-process granting to enable a staged introduction that does not require the dedication of an entire carrier for high-bitrate operations.

An object of the present teachings is to solve or at least alleviate at least one of the above mentioned problems.

The object is according to a first aspect achieved by a method performed by a control system that controls the usage of a first carrier, which first carrier is divided into transmission segments and each transmission segment consisting of N transmission time intervals, where N is greater than or equal to 2. The method comprises the control system:

configuring a first wireless communication device to transmit data on a physical traffic channel using the first carrier by transmitting the data only during a first subset of the N transmission time intervals in each transmission segment, wherein the first subset of the N transmission time intervals consists of n transmission time intervals and n<N;

configuring the first wireless communication device to transmit control information on a physical control channel using the first carrier by transmitting the control information during only the first subset of transmission time intervals in each transmission segment; and scheduling a downlink transmission for the first wireless communication device such that a transmission of a feedback signal by the first wireless communication device in response to the downlink transmission will occur only during one or more of the transmission time intervals included in the first subset of transmission time intervals in each transmission segment.

The object is according to a second aspect achieved by a control system configured to control the usage of a first carrier, which is divided into transmission segments and each transmission segment consisting of N transmission time intervals, where N is greater than or equal to 2. The control system is arranged to:

configure a first wireless communication device to transmit data on a physical traffic channel using the first carrier by transmitting the data only during a first subset of the N transmission time intervals in each transmission segment, wherein the first subset of the N transmission time intervals consists of n transmission time intervals and n<N;

configure the first wireless communication device to transmit control information on a physical control channel using the first carrier by transmitting the control information during only the first subset of transmission time intervals in each transmission segment; and schedule a downlink transmission for the first wireless communication device such that a transmission of a feedback signal by the first wireless communication device in response to the downlink transmission will occur only during one or more of the transmission time intervals included in the first subset of transmission time intervals in each transmission segment.

Further features and advantages of the present disclosure will become clear upon reading the following description and the accompanying drawings.

BRIEF DESCRIPTION OF THE DRAWINGS

The present disclosure will become more fully understood from the detailed description provided hereinafter and the accompanying drawings which are given by way of illustration only. In the different drawings, same reference numerals correspond to the same element.

ACRONYMS AND ABBREVIATIONS

Figure 1:
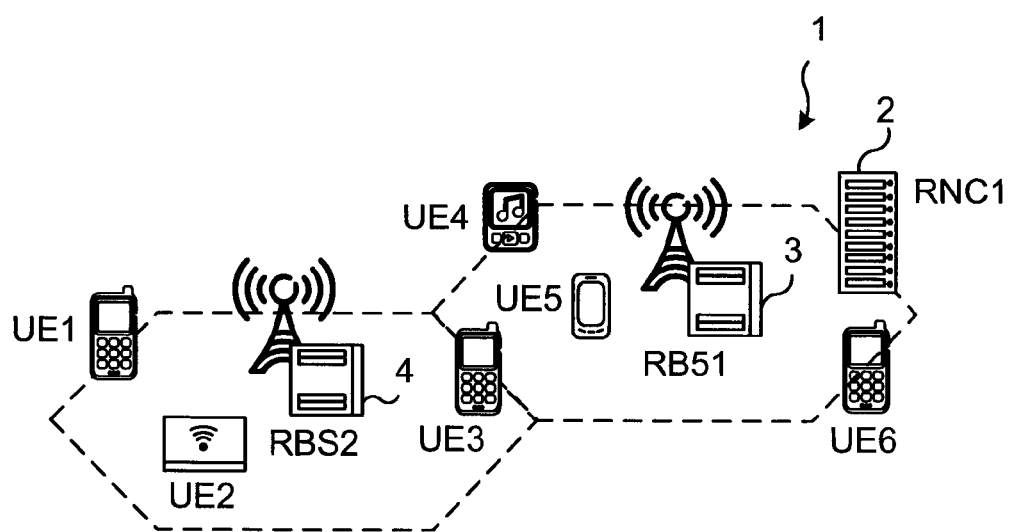
FIG. 1 illustrates a mobile communications network in which the disclosure is applicable.

3GPP Third Generation Partnership Project
ACK Acknowledgement
AG Absolute Grant
CDM Code Division Multiplexing
CDMA Code Division Multiple Access
CPC Continuous Packet Connectivity
CQI Channel Quality Index
DL Downlink
DPCCH Dedicated Physical Control Channel
DTX Discontinuous Transmission
E-AGCH Enhanced dedicated channel Absolute Grant Channel
E-DCH Enhanced Dedicated Channel
E-DPCCH Enhanced Dedicated Physical Control Channel
E-DPDCH Enhanced Dedicated Physical Data Channel
E-HICH E-DCH Hybrid ARQ Indicator Channel
EUL Enhanced Uplink
F-DPCH Fractional Dedicated Physical Channel
HARQ Hybrid Automatic Repeat Request
HDR High Data Rate
HSPA High-Speed Packet Access
HSPA+ Evolved HSPA
HS-DPCCH High Speed Dedicated Physical Control Channel
HS-SCCH HS-DSCH Shared Control Channel
HSUPA High-Speed Uplink Packet Access
IC Interference Cancellation
IFHO Inter-Frequency Handover
L1 Layer one
LDR Low Data Rate
MAC Medium Access Control
MC Multicarrier
NBAP Node B Application Part
PDU Protocol Data Unit
QoS Quality of Service
RBS Radio Base Station
RDTR Requested Data Transmission Rate
RRC Radio Resource Control
SG Serving Grant
SI Scheduling Information
SIR Scheduling Information Report
TPC Transmit Power Control
TTI Transmission Time Interval
TDM Time Division Multiplexing
UE User Equipment
UL Uplink
WCD Wireless Communication Device (a.k.a. UE)
WCDMA Wideband Code Division Multiple Access

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

The present disclosure provides a cost-effective method for introducing clean carrier operations. In some embodiments, this method includes time-multiplexing legacy WCDs and clean-carrier WCDs on the same carrier. For example, the method may include: (1) configuring each of a first set of one or more WCDs (e.g. a set of one or more legacy WCDs) such that each WCD included in the first set utilizes the carrier only during first time periods and (2) configuring each of a second set of one or more WCDs (e.g. a set of high-bitrate capable WCDs) such that each WCD included in the second set utilizes the carrier only during second time periods, wherein the first time periods and the second time periods are substantially disjoint (e.g. no time interval included in a first time period is included in a second time period). In this way, the carrier can be considered a "hybrid" carrier.

Referring now to FIG. 1, FIG. 1 illustrates an example of a mobile communication network 1 in which the embodiments described herein may be implemented. In this example, the network 1 includes a radio network controller (RNC) 2 supervising a number of radio base stations (RBS) 3, 4. The network 1 is populated with various types of wireless communication devices (WCDs) UE1, UE2, UE3, UE4, UE5, UE6. Some (e.g. WCD UE5) may be very close to one of the RBSs 3, some (e.g. WCD UE6) may be rather far away, and some (e.g. WCD UE2 and WCD UE5) can benefit from high-bitrate transmissions.

Figure 2:
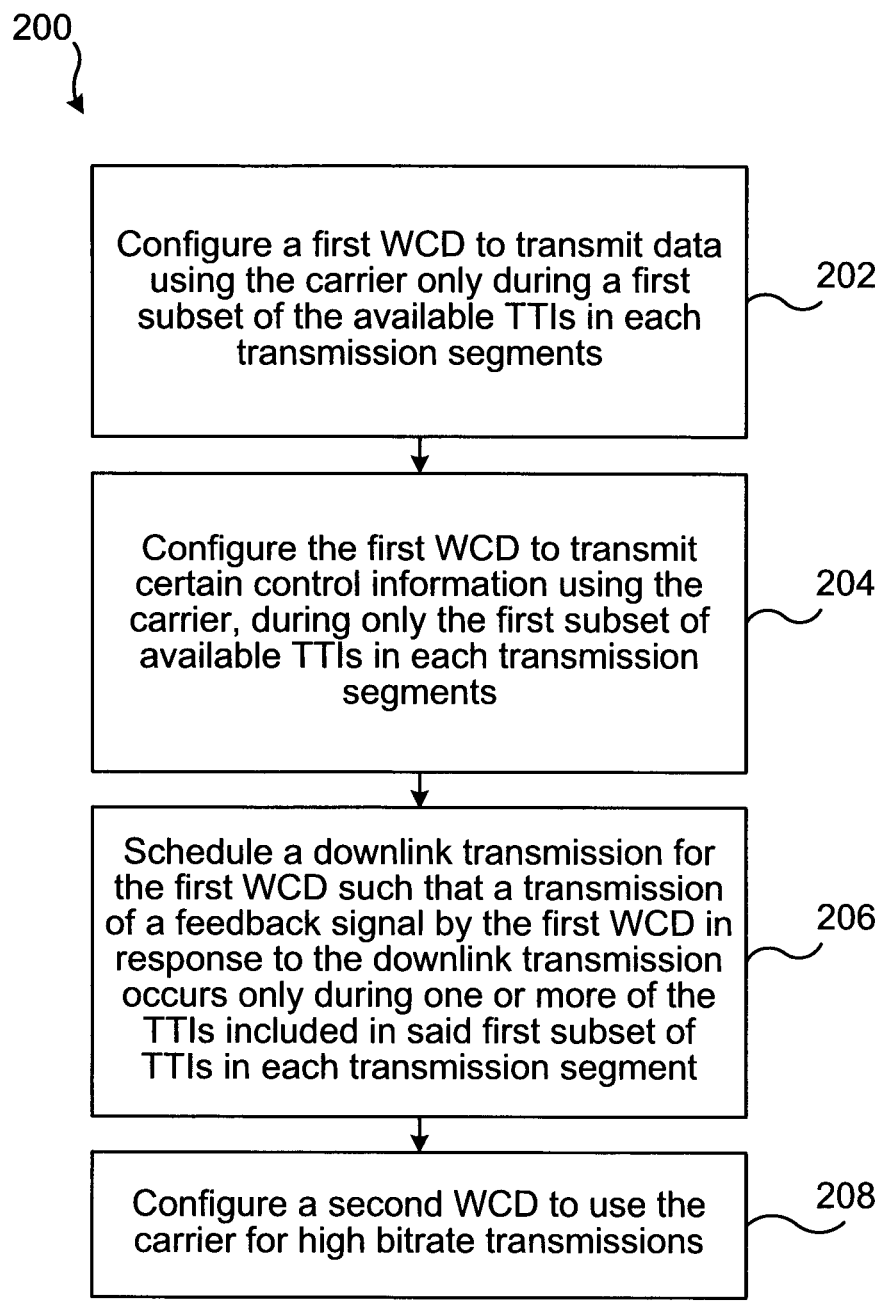
FIG. 2 is a flow chart illustrating a process according to some embodiments.

FIG. 2 is a flow chart illustrating a process 200 performed by a control system (e.g. RNC 2 or a combination of an RNC 2 and an RBS 3, 4) that controls the usage of a carrier, which is divided into transmission segments and each transmission segment consisting of N transmission time intervals (TTIs).

The method may begin with step 202, where the control system configures a first WCD such that, when the first WCD transmits data on a physical traffic channel using the carrier, the first WCD will transmit the data only during a first subset of the N TTIs in each transmission segment, wherein the first subset of the N TTIs consists of n TTIs and n<N. The control system (e.g. RNC 2 and/or RBS 3, 4) may so configure the WCD by transmitting to the WCD one or more configuration messages, such as, for example, a Radio Bearer Reconfiguration message.

In some embodiments (e.g. WCDMA) the first WCD is capable of performing N HARQ processes, and the step of configuring the first WCD such that, when the first WCD transmits data on a physical traffic channel using the carrier, the first WCD will transmit the data only during a first subset of the N TTIs in each transmission segment comprises: restricting a grant to a subset of the N HARQ processes, wherein the subset of HARQ processes comprises n HARQ processes. The step of restricting a grant to a subset of the N HARQ processes may include transmitting to the first WCD an absolute grant that deactivates and/or activates one or more of the N HARQ processes. It is noted that each HARQ process may correspond to one TTI in each of the transmission segments.

In step 204, the control system further configures the first WCD such that, when the first WCD transmits certain control information on a physical control channel using the carrier, the first WCD will transmit the certain control information during only the first subset of available TTIs in each transmission segment. The control system may so configure the first WCD by transmitting to the WCD one or more configuration messages, such as, for example, a Radio Bearer Reconfiguration message.

In step 206, the control system schedules a certain downlink transmission for the first WCD such that a transmission of a feedback signal by the first WCD in response to the downlink transmission will occur only during one or more of the TTIs included in said first subset of TTIs in each transmission segment.

In step 208, the control system configures a second WCD to use the carrier for high bitrate transmissions. In some embodiments, the control system performs step 208 in response to receiving an SIR (or other information regarding the status of the second WCD's transmit buffers) from the second WCD, which was transmitted using a different carrier. Step 208 may be accomplished by the control system configuring the second WCD such that, when the second WCD transmits data on a physical traffic channel using the carrier, the second WCD will transmit the data during only a second subset of the N TTIs in the transmission segments, wherein the first and second subsets are disjoint. In some embodiments, the control system further configures the second WCD such that, when the second WCD transmits certain control information on a physical control channel using the carrier, the second WCD will transmit the certain control information during only the second subset of available TTIs in each transmission segment, but in other embodiments there is no problem to allow the second WCD to transmit some control information during the first subset of available TTIs because the spillover of control signaling from the high bitrate part to the legacy part would unlikely create significant interference since the legacy part has only moderate bitrates and control signaling is usually done at a rather low bitrate. In some embodiments, the control system may configure the second WCD to transmit some control information on a physical control channel using a different carrier.

Referring back to FIG. 1, the example network 1 shown in FIG. 1 may be an HSPA or HSPA+ network. Enhanced UL transmissions in HSPA and HSPA+ use the HARQ protocol and multiple HARQ processes to facilitate high-bitrate transmissions. For a 2 ms TTI, each WCD uses 8 HARQ processes that provide 8 independent transmission streams in 8 consecutive TTIs. The current 3GPP standard allows the serving grant of a WCD to be limited to a subset of these HARQ processes. For scheduled data per-HARQ-process grants are issue using an Absolute Grant (AG), which consists of a grant value and a one-bit grant scope. When the grant-scope bit is set, the AG instructs the WCD to (1) change its Serving Grant (SG) to that indicated by the grant value and (2) activate the HARQ process (if not already activated) pointed to by the AG. The special grant value INACTIVE is used to deactivate the HARQ process pointed to by the AG. For non-scheduled data, the granted HARQ processes are specified during radio bearer setup or reconfiguration using a bitmap with one bit assigned to each HARQ process As mentioned above, some embodiments of the disclosure for introducing a clean carrier in a WCDMA network uses per-HARQ-process granting to enable a staged introduction that does not require the dedication of an entire carrier for high-bitrate operations. The following describes a process, according to some embodiments, that enables legacy operations to co-exist with clean-carrier operations on the same carrier in a WCDMA network.

Step 1: All WCDs (legacy or clean-carrier-capable) are subframe-aligned, i.e. the chip timing of all WCDs are configured so that the HARQ process boundaries for different users are time-aligned.

Step 2: A carrier to be used for clean-carrier operation is divided into two parts based on user HARQ processes: one part for legacy operations and one part for clean-carrier operations. That is, the operation is divided into a first set of time periods and a second set of time periods, and the first set of time periods for legacy operations and the second set for the clean-carrier operations. Preferably, the first set and the second set of time periods are disjoint. The boundary between the two sets, however, may be adjusted dynamically for scheduled data according to need.

As one example, two HARQ processes may initially be dedicated to clean-carrier operations and six HARQ processes to legacy operations. At a later stage, the eight HARQ processes may be split equally for clean-carrier and legacy operations.

The granted HARQ processes for legacy WCDs confine the UL data transmissions to those HARQ processes, but other control-level transmissions may still take place outside of the granted HARQ processes. The significantly higher interference level in the outside HARQ processes that are reserved for clean-carrier operation may pose a problem for these transmissions. The following may be used to restrict the transmission of various types of control information to within the granted HARQ processes:

Dedicated Physical Control Channel (DPCCH):

This physical control channel carries the pilot and Transmit Power Control (TPC) bits. It is essential for maintaining synchronization and power control of the connection and is also used as a reference for data decoding. It is normally transmitted continuously irrespective of the granted HARQ processes.

Discontinuous Transmission (DTX) of the DPCCH can be configured using Continuous Packet Connectivity (CPC) so that DPCCH transmission would stop as soon as UL data ends. When there is no data transmission, periodic bursts of DPCCH are transmitted for synchronization and power control purposes. These periodic bursts can also fall outside the granted HARQ processes. Special CPC configuration can be used to confine the periodic bursts to within the granted HARQ processes, with the DTX cycle length set to a multiple of 8 HARQ processes and the burst length to a value no larger than the length of the granted HARQ processes.

It should be noted that there is certain control data (more specifically, a 2-slot preamble and a 1-slot postamble) transmitted before and after each DPCCH burst. At least some of these preambles and postamble may still be transmitted outside of the grant HARQ processes. They do not pose any significant problem for the network or the WCDs since the extra interference created is small and neither the network nor the WCD relies much on them for performance.

Channel Quality Index (CQI):

CQI reports are transmitted regularly on the UL on the HS-DPCCH and are not necessarily aligned with the WCD's granted HARQ processes on the UL. They are needed for power control of DL transmissions on the High Speed Downlink Shared Channel (HS-DSCH). CQI transmissions can be confined within the granted HARQ processes using an offset and a reporting cycle that is a multiple of 8 HARQ processes. The offset and reporting cycle can be set by the control system and communicated to the WCD in a configuration message (e.g. a Radio Bearer configuration message).

High Speed Acknowledgments (HS ACKs):

ACKs and NAKs for HS-DSCH transmissions are also transmitted on the UL on the HS-DPCCH. The timing of the transmissions is related to the time the corresponding DL data are transmitted, and thus can easily fall outside the granted HARQ processes. Since the granted HARQ processes for legacy operations may be configured statically for the whole cell, DL data can be scheduled in such a way that their ACKs would always be transmitted during the granted HARQ processes. For a static configuration thus, the scheduling may be performed in an easily implemented way. However, it is noted that HARQ processes may also be granted dynamically. If the HARQ processes are granted dynamically, then the HS scheduling may be configured to handle each user separately.

So far, only legacy operations in the CELL_DCH state have been addressed. For WCDs that are starting in other RRC states, they have to first make a random access via the CELL_FACH state. A random access consists of two parts: power ramping and message transmissions. Neither can be made to align with the granted HARQ processes without standard changes. One strategy is to restrict random accesses to regular carriers. If a legacy WCD is to be switched up to the CELL_DCH state, it may be considered for setting up on the legacy part of the hybrid carrier. Redirecting a WCD from one carrier to another during the CELL_FACH to CELL_DCH transition is a procedure that is routinely performed in existing networks.

To summarize, one possible method for accommodating both legacy and clean-carrier operations on the same carrier in a WCDMA system involves: (1) aligning all CELL_DCH users in time, (2) time-multiplexing the two types of operations (legacy and clean-carrier) using different HARQ processes, (3) limiting control signaling to within the allocated HARQ processes, and (4) re-balancing the CELL_FACH to CELL_DCH traffic in other legacy carriers to take into account that the carrier configured with clean-carrier operations cannot accommodate any (legacy) CELL_FACH traffic.

Figure 3:
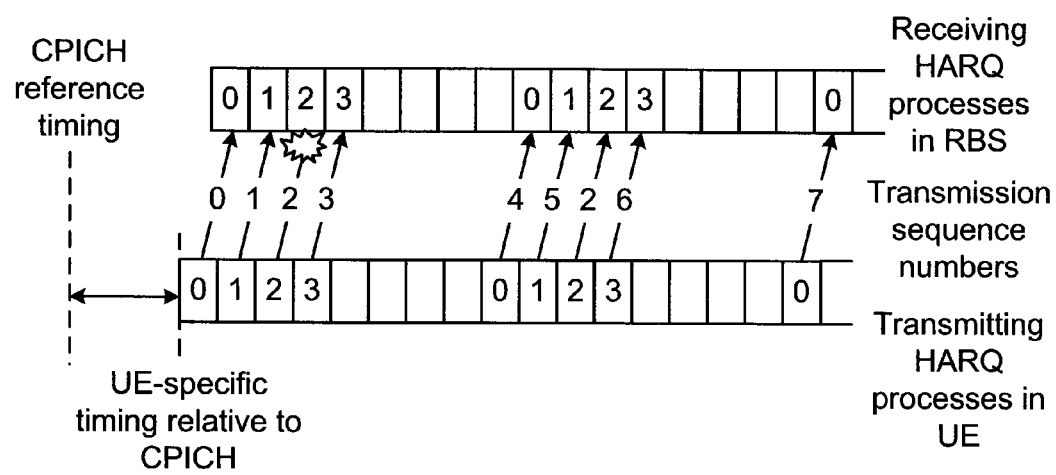
FIG. 3 illustrates HARQ processes.

FIG. 3 illustrates the use of HARQ processes for the Enhanced Uplink (EUL) 2 ms TTI. In this example, a WCD has been granted by the control system the four HARQ processes 0 to 3 so that the WCD transmits data in four parallel streams. In this example, transmission number 2 is lost and is retransmitted 8 TTIs later in the same stream in HARQ process 2. The other three streams are not interrupted by the retransmission.

Figure 4:
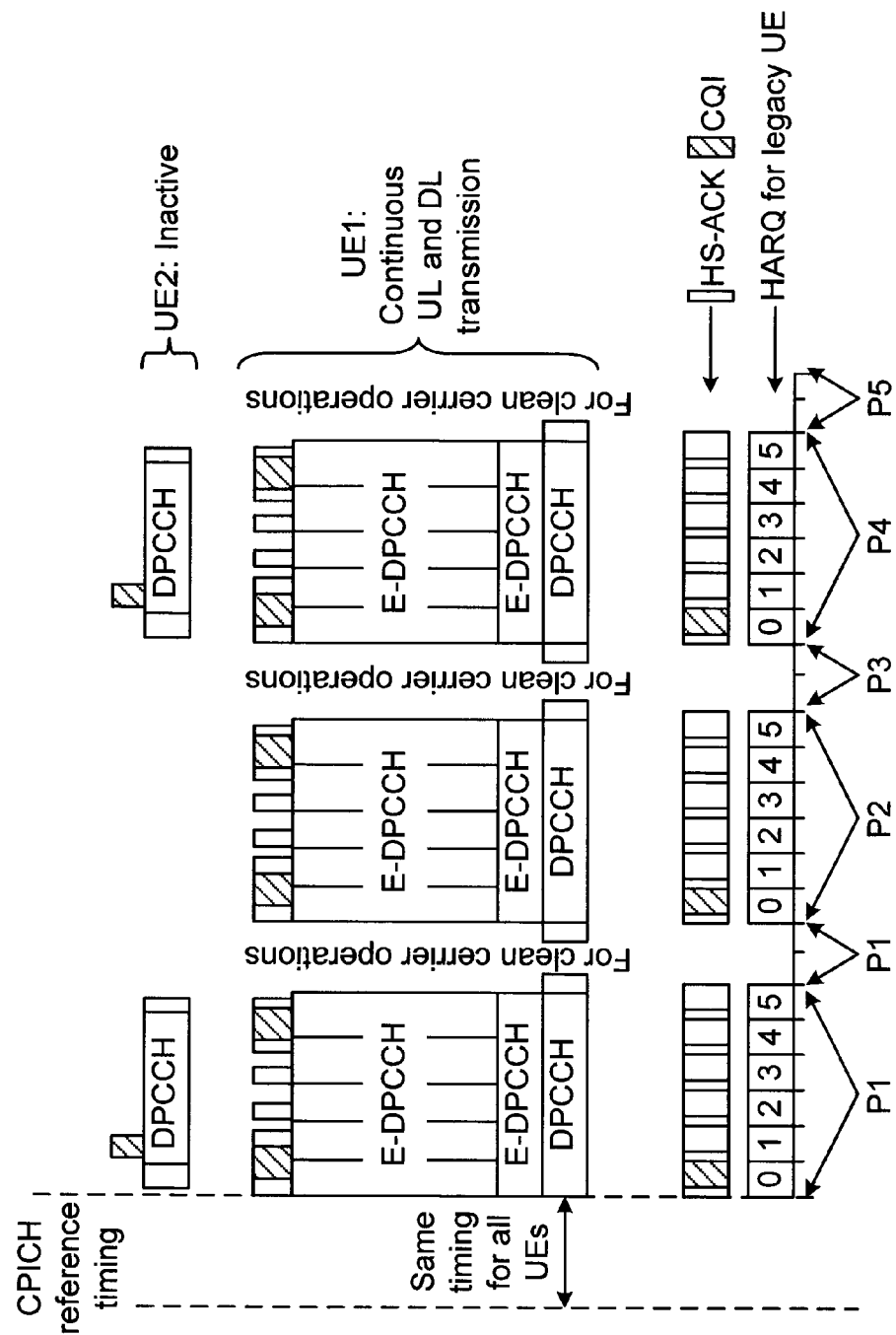
FIG. 4 illustrates the concept of time-multiplexing legacy users and clean-carrier users on the same carrier in a WCDMA context.

FIG. 4 illustrates the concept of time-multiplexing legacy users and clean-carrier users on the same carrier. In this example, 6 HARQ processes are allocated for legacy use. A first WCD (labeled as "UE1") is undergoing continuous UL and DL transmission. It is configured with an 8 ms (4 TTI) CQI reporting cycle and is receiving HS ACKs every TTI. Note that when it stops UL data transmissions, the DPCCH immediately goes into DTX and a 1-slot postamble and a 2-slot preamble is transmitted when the first WCD goes in and out of DTX. For a second WCD (labeled as "UE2"), both the UL and the DL are inactive. It is configured with a DTX cycle of 32 ms (16 TTIs) and a CQI reporting cycle of also 32 ms. As shown in FIG. 4 both the first WCD and the second WCD are configured such that, (a) when the WCDs transmit data on a physical traffic channel using the carrier, the WCDs will transmit the data only during a time period included in a first set of time periods, and (b) when the WCDs transmit certain control information on a physical control channel using the carrier, the WCDs will transmit the certain control information during only a time period included in the first set of time periods. Thus, a second set of time periods, which includes time periods P1, P3 and P5, can be configured for clean-carrier operation.

As illustrated in FIG. 4, the first WCD and the second WCD are configured such that when they transmit, they only transmit (with the exception of the short preamble and postamble mentioned above) only during a subset of the N TTI's in each transmission segment. For example, a first transmission segment consist of time periods Po and P1, which consist of TTIs 0-5 and 6-7, respectively, and the first WCD and the second WCD2 transmit only during Po so that during time period P1 the carrier can be treated as a clean-carrier. Likewise, second first transmission segment consist of time periods P2 and P3, which consist of TTIs 0-5 and 6-7, respectively, and the first WCD and the second WCD transmit only during P2 so that during time period P3 the carrier can be treated as a clean-carrier. In this way, legacy WCDs and clean-carrier WCDs can be time-multiplexed on the carrier so that the carrier becomes a "hybrid" carrier, i.e. for some of the time the carrier is utilized to carry traffic from legacy WCDs and for the remaining time the carrier may be utilized in a clean-carrier mode and carry high-bitrate traffic transmitted by clean-carrier capable WCDs.

Figure 5:
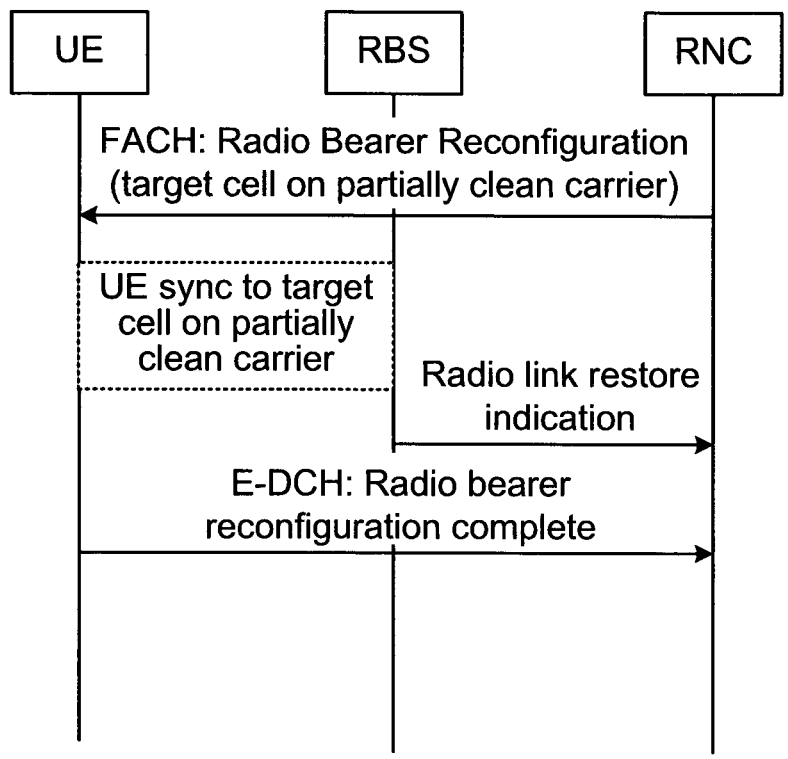
FIG. 5 shows a sequence diagram for an inter-frequency redirection during a transition from the CELL_FACH state on one carrier to the CELL_DCH state on another carrier configured as a hybrid carrier

FIG. 5 shows a sequence diagram for an inter-frequency redirection during a transition from the CELL_FACH state on one carrier to the CELL_DCH state on another carrier configured as a partially clean carrier. In this example, a co-locating cell on the hybrid carrier is specified in the CELL_DCH configuration. The (initial) grants for scheduled and unscheduled data are also specified in the Radio Bearer Reconfiguration message for the WCD to be able to send the Radio Bearer Reconfiguration Complete message immediately. WCDs in all non CELL_DCH state in connected mode go through a similar signaling sequence. WCDs in idle mode also go through a similar signaling sequence with the Radio Bearer Reconfiguration messages replaced by corresponding RRC Connection Setup messages.

The features described above may be combined in different ways to provide various embodiments of a method for controlling usage of a first carrier. In particular, a method 200 performed by a control system 2, 3, 4 is provided that controls the usage of a first carrier, which first carrier is divided into transmission segments and each transmission segment consisting of N transmission time intervals, where N is greater than or equal to 2. The method 200 comprises the control system 2, 3, 4:

configuring 202 a first wireless communication device UE1 to transmit data on a physical traffic channel using the first carrier by transmitting the data only during a first subset of the N transmission time intervals in each transmission segment, wherein the first subset of the N transmission time intervals consists of n transmission time intervals and n<N;

configuring 204 the first wireless communication device UE1 to transmit control information on a physical control channel using the first carrier by transmitting the control information during only the first subset of transmission time intervals in each transmission segment; and scheduling 206 a downlink transmission for the first wireless communication device UE1 such that a transmission of a feedback signal by the first wireless communication device UE1 in response to the downlink transmission will occur only during one or more of the transmission time intervals included in the first subset of transmission time intervals in each transmission segment.

In an embodiment, the method 200 comprises configuring for each transmission segment a complete set of the N HARQ processes for the first wireless communication device UE1.

In an embodiment, the configuring 202 the first wireless communication device UE1 to transmit data on a physical traffic channel comprises restricting a grant to a subset of N Hybrid Automatic Repeat Request, HARQ, processes, wherein the subset of HARQ processes comprises n HARQ processes.

In a variation of the above embodiment, the restricting the grant to a subset of the N HARQ processes comprises transmitting to the first wireless communication device UE1 an absolute grant deactivating and/or activating one or more of the N HARQ processes.

In an embodiment, the method 200 comprises configuring a second wireless communication device UE2 to use the first carrier for high bitrate transmissions.

In a variation of the above embodiment, the configuring a second wireless communication device UE2 comprises configuring the second wireless communication device UE2 to transmit data on a physical traffic channel using the first carrier by transmitting the data during only a second subset of the N transmission time intervals in the transmission segments, wherein the first and second subsets are disjoint.

In a variation of the above embodiment, the method 200 further comprises configuring the second wireless communication device UE2 to transmit control information on a physical control channel using the first carrier by transmitting the control information during only the second subset of available transmission time intervals in each transmission segment.

In a variation of the above embodiment, the method 200 further comprises scheduling a downlink transmission for the second wireless communication device UE2 such that a transmission of a feedback signal by the second wireless communication device UE2 in response to the downlink transmission may occur only during one or more of the transmission time intervals included in the second subset of transmission time intervals in each transmission segment.

In an embodiment, the method 200 further comprises receiving a scheduling information report and/or other control information transmitted from a second wireless communication device UE2 using a second carrier that is separate and distinct from the first carrier; the control system 2, 3, 4 configuring, based on information included in the scheduling information report, the second wireless communication device UE2 to use the first carrier for high bitrate transmissions.

In an embodiment, the control system 2, 3, 4 comprises a radio network controller 2 and a radio base station 3, 4, wherein the radio network controller 2 performs the configuring 202, 204, and the radio base station 3, 4 performs the scheduling 206. In other embodiments the control system 2, 3, 4 comprises a radio network controller 2 or a radio base station 3, 4.

Figure 6:
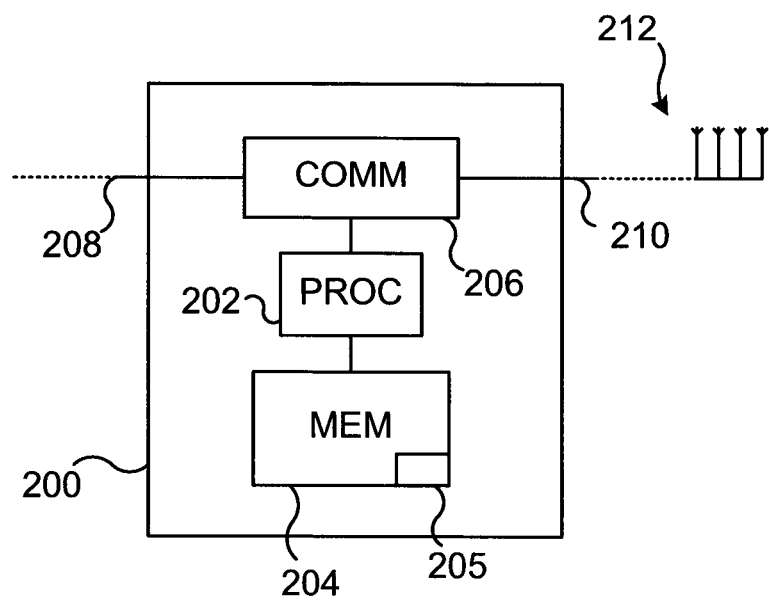
FIG. 6 is a block diagram illustrating a network node according to some embodiments.

FIG. 6 is a functional block diagram that schematically illustrates a network node (e.g. RNC 2, RBS 3, RBS 4 of FIG. 1), according to some embodiments. The network node may include processing means, memory means and communication means in the form of a processing device 302 (e.g. one or more of the following: microprocessors, application specific integrated circuits—ASICs, Field-programmable gate arrays (FPGAs), logic circuits, and other circuits), a memory 304 (e.g. non-volatile memory such as hard disk, flash memory or other storage unit) and communication circuitry 306. The network node may communicate with other nodes via a first data path 308 or via a second data path 310. For example, the first data path 308 can be connected to a network and the second data path 210 can connected to one or more antennas 312.

A control system 2, 3, 4 is thus provided configured to control the usage of a first carrier, which is divided into transmission segments and each transmission segment consisting of N transmission time intervals, where N is greater than or equal to 2.

The control system 2, 3, 4 is arranged to configure a first wireless communication device UE1 to transmit data on a physical traffic channel using the first carrier by transmitting the data only during a first subset of the N transmission time intervals in each transmission segment, wherein the first subset of the N transmission time intervals consists of n transmission time intervals and n<N.

The control system 2, 3, 4 is further arranged to configure the first wireless communication device UE1 to transmit control information on a physical control channel using the first carrier by transmitting the control information during only the first subset of transmission time intervals in each transmission segment.

The control system 2, 3, 4 is further arranged to schedule a downlink transmission for the first wireless communication device UE1 such that a transmission of a feedback signal by the first wireless communication device UE1 in response to the downlink transmission will occur only during one or more of the transmission time intervals included in the first subset of transmission time intervals in each transmission segment.

In an embodiment, the control system 2, 3, 4 is arranged to configure for each transmission segment a complete set of N HARQ processes for the first wireless communication device UE1. That is, an uplink transmission procedure comprising a set of N Hybrid Automatic Repeat Request, HARQ, processes may be provided, wherein the control system is arranged to configure for each transmission segment a complete set of the N HARQ processes for the first wireless communication device UE1.

In an embodiment, the control system 2, 3, 4 is arranged to configure the first wireless communication device UE1 to transmit data on a physical traffic channel by restricting a grant to a subset of N Hybrid Automatic Repeat Request, HARQ, processes, wherein the subset of HARQ processes comprises n HARQ processes.

In a variation of the above embodiment, the control system 2, 3, 4 is arranged to restrict the grant to a subset of the N HARQ processes by transmitting to the first wireless communication device UE1 an absolute grant deactivating and/or activating one or more of the N HARQ processes.

In an embodiment, the control system 2, 3, 4 is arranged to configure a second wireless communication device UE2 to use the first carrier for high bitrate transmissions.

In a variation of the above embodiment, the control system 2, 3, 4 is arranged to configure a second wireless communication device UE2 to transmit data on a physical traffic channel using the first carrier by transmitting the data during only a second subset of the N transmission time intervals in the transmission segments, wherein the first and second subsets are disjoint.

In a variation of the above embodiment, the control system 2, 3, 4 is arranged to configure the second wireless communication device UE2 to transmit control information on a physical control channel using the first carrier by transmitting the control information during only the second subset of available transmission time intervals in each transmission segment.

In a variation of the above embodiment, the control system 2, 3, 4 is arranged to schedule a downlink transmission for the second wireless communication device UE2 such that a transmission of a feedback signal by the second wireless communication device UE2 in response to the downlink transmission may occur only during one or more of the transmission time intervals included in the second subset of transmission time intervals in each transmission segment.

In an embodiment, the control system 2, 3, 4 is arranged to receive a scheduling information report and/or other control information transmitted from a second wireless communication device UE2 using a second carrier that is separate and distinct from the first carrier; and arranged to configure, based on information included in the scheduling information report, the second wireless communication device UE2 to use the first carrier for high bitrate transmissions.

In an embodiment, the control system 2, 3, 4 comprises a radio network controller 2 and a radio base station 3, 4, wherein the radio network controller 2 is arranged to:
configure a first wireless communication device UE1 such that, when the first wireless communication device UE1 transmits data on a physical traffic channel using the first carrier, the first wireless communication device UE1 will transmit the data only during a first subset of the N transmission time intervals in each transmission segment, wherein the first subset of the N transmission time intervals consists of n transmission time intervals and n<N;
configure the first wireless communication device UE1 such that, when the first wireless communication device UE1 transmits control information on a physical control channel using the first carrier, the first wireless communication device UE1 will transmit the control information during only the first subset of available transmission time intervals in each transmission segment;
and wherein the radio base station 3, 4 is arranged to:
schedule a downlink transmission for the first wireless communication device UE1 such that a transmission of a feedback signal by the first wireless communication device UE1 in response to the downlink transmission will occur only during one or more of the transmission time intervals included in the first subset of transmission time intervals in each transmission segment.

In the various embodiments, the control system 2, 3, 4 may comprises a radio network controller 2 or a radio base station 3, 4.

The methods described herein can be implemented in one or more network nodes. In such embodiments, the method actions are realized by means of software instructions 305 that are stored in the memory 304 and are executable by the processor 302. Such software instructions 305 can be realized and provided in any suitable way, e.g. installed during manufacturing, as the skilled person will realize. Moreover, the memory 304, the processor 302, as well as the communication circuitry 306 comprise software and/or firmware that, in addition to being configured such that it is capable of implementing the methods to be described, is configured to control the general operation of the network node, when operating in a cellular mobile communication system such as the system 1 in FIG. 1. However, for the purpose of avoiding unnecessary detail, no further description will be made in the present disclosure regarding this general operation.

The present disclosure thus encompasses a computer program for control system 2, 3, 4 that controls the usage of a first carrier, which first carrier is divided into transmission segments and each transmission segment consisting of N transmission time intervals, where N is greater than or equal to 2. The computer program comprising computer program code, which, when run on the control system 2, 3, 4 (e.g. a processor 302 thereof), causes the control system to:
configure a first wireless communication device UE1 to transmit data on a physical traffic channel using the first carrier by transmitting the data only during a first subset of the N transmission time intervals in each transmission segment, wherein the first subset of the N transmission time intervals consists of n transmission time intervals and n<N;
configure the first wireless communication device UE1 to transmit control information on a physical control channel using the first carrier by transmitting the control information during only the first subset of transmission time intervals in each transmission segment; and
schedule a downlink transmission for the first wireless communication device UE1 such that a transmission of a feedback signal by the first wireless communication device UE1 in response to the downlink transmission will occur only during one or more of the transmission time intervals included in the first subset of transmission time intervals in each transmission segment.

The disclosure also encompasses a computer program product comprising the above computer program and computer readable means on which the computer program is stored.

The methods/systems disclosed herein provide several advantages. The methods/systems enable a soft introduction of the clean-carrier concept without having to dedicate an entire carrier for the purpose. Since the deployment of a new feature often drives the need for the feature, this soft introduction will be very beneficial to the ultimate success of any clean-carrier solution.

Modifications of the disclosed embodiments and other embodiments will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

As described above, this disclosure describes the following embodiments:

1. A method performed by a control system that controls the usage of a carrier, which is divided into transmission segments and each transmission segment consisting of N transmission time intervals (TTIs), where N is greater than or equal to 2, the method comprising:

the control system configuring a first wireless communication device (WCD) such that, when the first WCD transmits data on a physical traffic channel using the carrier, the first WCD will transmit the data only during a first subset of the N TTIs in each transmission segment, wherein the first subset of the N TTIs consists of n TTIs and n<N;

the control system further configuring the first WCD such that, when the first WCD transmits control information on a physical control channel using the carrier, the first WCD will transmit the control information during only the first subset of available TTIs in each transmission segment; and the control system scheduling a downlink transmission for the first WCD such that a transmission of a feedback signal by the first WCD in response to the downlink transmission will occur only during one or more of the TTIs included in said first subset of TTIs in each transmission segment.

2. The method of embodiment 1, wherein the step of configuring the first WCD such that, when the first WCD transmits data on a physical traffic channel using the carrier, the first WCD will transmit the data only during a first subset of the N TTIs in each transmission segment comprises:

restricting a grant to a subset of N HARQ processes, wherein the subset of HARQ processes comprises n HARQ processes.

3. The method of embodiment 2, wherein the step of restricting the grant to a subset of the N HARQ processes may include transmitting to the first WCD an absolute grant that deactivates and/or activates one or more of the N HARQ processes.

4. The method of any of embodiments 1-3, wherein the control system comprises a radio network controller (RNC) and a radio base station (RBS), the RNC performs the configuring steps, and the RBS performs the scheduling step.

5. The method of any of embodiments 1-4, wherein the control system comprises a radio network controller (RNC), the RNC performs the configuring steps, and the RNC performs the scheduling step.

6. The method of any of embodiments 1-5, further comprising the control system configuring a second WCD to use the carrier for high bitrate transmissions.

7. The method of embodiment 6, wherein the step of configuring the second WCD to use the carrier for high bitrate transmissions comprises the control system configuring the second WCD such that, when the second WCD transmits data on a physical traffic channel using the carrier, the second WCD will transmit the data during only a second subset of the N TTIs in the transmission segments, wherein the first and second subsets are disjoint.

8. The method of embodiment 7, further comprising:

the control system further configuring the second WCD such that, when the second WCD transmits control information on a physical control channel using the carrier, the second WCD may transmit the control information during only the second subset of available TTIs in each transmission segment;

9. The method of embodiment 8, further comprising:

the control system scheduling a downlink transmission for the second WCD such that a transmission of a feedback signal by the second WCD in response to the downlink transmission may occur only during one or more of the TTIs included in said second subset of TTIs in each transmission segment.

10. The method of any of embodiments 1-9, further comprising the control system receiving a scheduling information report (SIR) transmitted from a second WCD using a primary carrier that is separate and distinct from the first recited carrier ("first carrier");

the control system, based on information included in the SIR, configuring the second WCD to use the first carrier for high bitrate transmissions.

11. A method performed by a control system that controls the usage of a carrier, the method comprising:

the control system configuring a first wireless communication device (WCD) such that, when the first WCD transmits data on a physical traffic channel using the carrier, the first WCD will transmit the data only during a time period included in a first set of time periods;

the control system further configuring the first WCD such that, when the first WCD transmits control information on a physical control channel using the carrier, the first WCD will transmit the control information during only a time period included in the first set of time periods;

the control system scheduling a downlink transmission for the first WCD such that a transmission of a feedback signal by the first WCD in response to the downlink transmission will occur only during a time period included in the first set of time periods; and the control system configuring a second WCD to use the carrier for high bitrate transmissions, wherein the step of configuring a second WCD to use the carrier for high bitrate transmissions comprises:

the control system configuring the second WCD such that, when the second WCD transmits data on a physical traffic channel using the carrier, the second WCD will transmit the data only during a time period included in a second set of time periods, wherein the first and second sets are disjoint.

12. The method of embodiment 11, wherein the step of configuring the second WCD to use the carrier for high bitrate transmissions further comprises:

the control system configuring the second WCD such that, when the second WCD transmits control information on a physical control channel using the carrier, the second WCD will transmit the control information during only a time period included in the second set of time periods.

The invention claimed is:

1. A method performed by a control system that controls the usage of a first carrier, which first carrier is divided into transmission segments and each transmission segment consists of N transmission time intervals, where N is greater than or equal to 2, the method comprising the control system:

configuring a first wireless communication device to transmit data on a physical traffic channel using the first carrier by transmitting the data only during a first subset of the N transmission time intervals in each transmission segment, wherein the first subset of the N transmission time intervals consists of n transmission time intervals and n<N;

configuring the first wireless communication device to transmit control information on a physical control channel using the first carrier by transmitting the control information during only the first subset of transmission time intervals in each transmission segment; and scheduling a downlink transmission for the first wireless communication device such that a transmission of a feedback signal by the first wireless communication device in response to the downlink transmission will occur only during one or more of the transmission time intervals included in the first subset of transmission time intervals in each transmission segment.

2. The method as claimed in claim 1, further comprising configuring for each transmission segment N Hybrid Automatic Repeat Request (HARQ) processes for the first wireless communication device.

3. The method as claimed in claim 1, wherein configuring the first wireless communication device to transmit data on the physical traffic channel comprises restricting a grant to a subset of N Hybrid Automatic Repeat Request (HARQ) processes, wherein the subset of HARQ processes comprises n HARQ processes.

4. The method as claimed in claim 3, wherein the restricting the grant to a subset of the N HARQ processes comprises transmitting to the first wireless communication device an absolute grant deactivating and/or activating one or more of the N HARQ processes.

5. The method as claimed in claim 1, further comprising configuring a second wireless communication device to use the first carrier for high bitrate transmissions.

6. The method as claimed in claim 5, wherein the configuring a second wireless communication device comprises configuring the second wireless communication device to transmit data on a physical traffic channel using the first carrier by transmitting the data during only a second subset of the N transmission time intervals in the transmission segments, wherein the first and second subsets are disjoint.

7. The method as claimed in claim 6, further comprising configuring the second wireless communication device to transmit control information on a physical control channel using the first carrier by transmitting the control information during only the second subset of available transmission time intervals in each transmission segment.

8. The method as claimed in claim 7, further comprising scheduling a downlink transmission for the second wireless communication device such that a transmission of a feedback signal by the second wireless communication device in response to the downlink transmission may occur only during one or more of the transmission time intervals included in the second subset of transmission time intervals in each transmission segment.

9. The method as claimed in claim 1, further comprising receiving a scheduling information report and/or other control information transmitted from a second wireless communication device using a second carrier that is separate and distinct from the first carrier; the control system configuring, based on information included in the scheduling information report, the second wireless communication device to use the first carrier for high bitrate transmissions.

10. The method as claimed in claim 1, wherein the control system comprises a radio network controller and a radio base station, wherein the radio network controller performs the configuring, and the radio base station performs the scheduling.

11. The method as claimed in claim 1, wherein the control system comprises a radio network controller or a radio base station.

12. A control system configured to control the usage of a first carrier, which is divided into transmission segments and each transmission segment consists of N transmission time intervals, where N is greater than or equal to 2, the control system being arranged to:

configure a first wireless communication device to transmit data on a physical traffic channel using the first carrier by transmitting the data only during a first subset of the N transmission time intervals in each transmission segment, wherein the first subset of the N transmission time intervals consists of n transmission time intervals and n<N;

configure the first wireless communication device to transmit control information on a physical control channel using the first carrier by transmitting the control information during only the first subset of transmission time intervals in each transmission segment; and schedule a downlink transmission for the first wireless communication device such that a transmission of a feedback signal by the first wireless communication device in response to the downlink transmission will occur only during one or more of the transmission time intervals included in the first subset of transmission time intervals in each transmission segment.

13. The control system as claimed in claim 12, wherein the control system is further arranged to configure for each transmission segment a complete set of N HARQ processes for the first wireless communication device.

14. The control system as claimed in claim 12, wherein the control system is further arranged to configure the first wireless communication device to transmit data on a physical traffic channel by restricting a grant to a subset of N Hybrid Automatic Repeat Request, HARQ, processes, wherein the subset of HARQ processes comprises n HARQ processes.

15. The control system as claimed in claim 14, wherein the control system is further arranged to restrict the grant to a subset of the N HARQ processes by transmitting to the first wireless communication device an absolute grant deactivating and/or activating one or more of the N HARQ processes.

16. The control system as claimed in claim 12, wherein the control system is further arranged to configure a second wireless communication device to use the first carrier for high bitrate transmissions.

17. The control system as claimed in claim 16, wherein the control system is further arranged to configure a second wireless communication device to transmit data on a physical traffic channel using the first carrier by transmitting the data during only a second subset of the N transmission time intervals in the transmission segments, wherein the first and second subsets are disjoint.

18. The control system as claimed in claim 17, wherein the control system is further arranged to configure the second wireless communication device to transmit control information on a physical control channel using the first carrier by transmitting the control information during only the second subset of available transmission time intervals in each transmission segment.

19. The control system as claimed in claim 18, wherein the control system is further arranged to schedule a downlink transmission for the second wireless communication device such that a transmission of a feedback signal by the second wireless communication device in response to the downlink transmission may occur only during one or more of the transmission time intervals included in the second subset of transmission time intervals in each transmission segment.

20. The control system as claimed in claim 12, wherein the control system is further arranged to receive a scheduling information report and/or other control information transmitted from a second wireless communication device using a second carrier that is separate and distinct from the first carrier; and arranged to configure, based on information included in the scheduling information report, the second wireless communication device to use the first carrier for high bitrate transmissions.

21. The control system as claimed in claim 12, wherein the control system comprises a radio network controller and a radio base station, wherein the radio network controller is arranged to:

configure a first wireless communication device such that, when the first wireless communication device transmits data on a physical traffic channel using the first carrier, the first wireless communication device will transmit the data only during a first subset of the N transmission time intervals in each transmission segment, wherein the first subset of the N transmission time intervals consists of n transmission time intervals and n<N;

configure the first wireless communication device such that, when the first wireless communication device transmits control information on a physical control channel using the first carrier, the first wireless communication device will transmit the control information during only the first subset of available transmission time intervals in each transmission segment;

and wherein the radio base station is arranged to:

schedule a downlink transmission for the first wireless communication device such that a transmission of a feedback signal by the first wireless communication device in response to the downlink transmission will occur only during one or more of the transmission time intervals included in the first subset of transmission time intervals in each transmission segment.

22. The control system as claimed in claim 12, wherein the control system comprises a radio network controller or a radio base station.

* * * * *